Patented Dec. 28, 1943

2,337,845

UNITED STATES PATENT OFFICE 2,337,845

1-DIAZOARYL-5-PYRAZOLONE-4-SULPHONIC ACIDS

Paul Zervas, Cologne-Mulheim, Germany, assignor to General Aniline & Film Corporation, New York, N. Y., a corporation of Delaware No Drawing. Application August 9, 1941, Serial No. 406,238. In Germany April 6, 1939

4 Claims. (Cl. 260—141)

The present invention relates to 1-diazoaryl-5-pyrazolone-4-sulphonic acids and to a method of preparing the same.

My copending application Ser. No. 406,239, filed August 9, 1941 (entitled "1-aminoaryl-5-pyrazolone-4-sulphonic acids"), now U. S. P. 2,315,834, relates to 1-aminoaryl-5-pyrazolone-4-sulphonic acids and to a method of preparing the same. It has now been found that these 1-aminoaryl-5-pyrazolone-4-sulphonic acids can easily be converted into diazo compounds by the interaction with nitrous acid without a splitting off of the sulphonic acid group. This could not be foreseen considering the instability of the sulphonic acid group in the 4-position of the pyrazolone nucleus.

The new diazo compounds thus obtainable are useful in the manufacture of dyestuffs hitherto not accessible.

The following examples illustrate the invention without, however, limiting it thereto, the parts being by weight.

Example 1

29.1 parts of sodium 1-(4'-aminophenyl)-3-methyl-5-pyrazolone-4-sulphonate are dissolved in about 100 parts of water and after cooling to 0° C. mixed with 30 parts of hydrochloric acid (29.5 per cent). Thereupon a 10 per cent solution of 6.9 parts of sodium nitrite is allowed to run into the mixture. A yellow diazo solution is obtained from which the diazo compound can be separated as a finely crystallized yellow precipitate by adding salt. The precipitate easily dissolves in water.

Example 2

29.1 parts of sodium 1-(3'-aminophenyl)-3-methyl-5-pyrazolone-4-sulphonate are dissolved in water and after cooling to 0° C. mixed with 30 parts of hydrochloric (29.5 per cent). Thereupon a 10 per cent solution of 6.9 parts of sodium nitrite is allowed to run into the mixture. A yellow diazo solution is obtained from which the diazo compound can be almost completely separated as a yellow precipitate by adding sodium chloride.

I claim:

1. Process of preparing 1-diazoaryl-5-pyrazolone-4-sulphonic acids which comprises treating 1-aminoaryl-5-pyrazolone-4-sulphonic acids with nitrous acid.

2. As a new product, 1-(4'-diazophenyl)-3-methyl-5-pyrazolone-4-sulphonic acid.

3. As a new product, 1-(3'-diazophenyl)-3-methyl-5-pyrazolone-4-sulphonic acid.

4. As new products, 1-diazophenyl-5-pyrazolone-4-sulphonic acids.

PAUL ZERVAS.